United States Patent

Doelle et al.

[11] Patent Number: 5,968,357
[45] Date of Patent: Oct. 19, 1999

[54] SCREEN BASKET HAVING A REMOVABLE AND REPLACEABLE CYLINDRICAL MESH LINER

[75] Inventors: Klaus Doelle; Kurt W. Lorenz, both of Appleton, Wis.

[73] Assignee: Voith Sulzer Paper Technology North America, Inc., Appleton, Wis.

[21] Appl. No.: 09/141,247

[22] Filed: Aug. 27, 1998

[51] Int. Cl.$^6$ .................................................. B01D 35/30
[52] U.S. Cl. .................... 210/485; 210/497.01; 210/499; 29/896.6; 29/902; 209/404; 209/406
[58] Field of Search .................................. 210/232, 403, 210/483, 484, 485, 497.01, 402, 217, 499, 415; 209/270, 404, 406, 306; 55/510, 496; 162/251, 272, 274; 29/896.6, 896.62, 902

[56] References Cited

U.S. PATENT DOCUMENTS

| | | |
|---|---|---|
| 3,716,144 | 2/1973 | Bartlow . |
| 5,223,134 | 6/1993 | Riva . |
| 5,255,790 | 10/1993 | Einoder et al. . |
| 5,326,470 | 7/1994 | Shaw . |
| 5,513,757 | 5/1996 | Papetti . |

FOREIGN PATENT DOCUMENTS

0414336 A2  2/1991  European Pat. Off. .

Primary Examiner—W. L. Walker
Assistant Examiner—Aaron Louis Schwartz
Attorney, Agent, or Firm—Samuels, Gauthier & Stevens, LLP

[57] ABSTRACT

A screen basket for filtering an aqueous fiber suspension includes a cylindrical foraminous filter element, anchoring collars surrounding and fixed to opposite ends of the filter element, at least two support rings surrounding the filter element, and support rods for adjusting the support rings between axially contracted positions disengaged from the anchoring collars, and axially expanded positions engaging the anchoring collars and axially tensioning the filter element. In a first embodiment, the anchoring collars are relatively flexible. This allows the anchoring collars to be deformed for insertion of the cylindrical foraminous filter element within the support rings. Alternatively, the upper and lower support rings are divided into segments that are easily disassembled and reassembled to facilitate removal of a defective cylindrical foraminous filter element and installation of a new filter element. Advantageously, the screen basket includes a reusable rigid frame that cooperates with a replaceable and disposable cylindrical foraminous filter element.

16 Claims, 7 Drawing Sheets

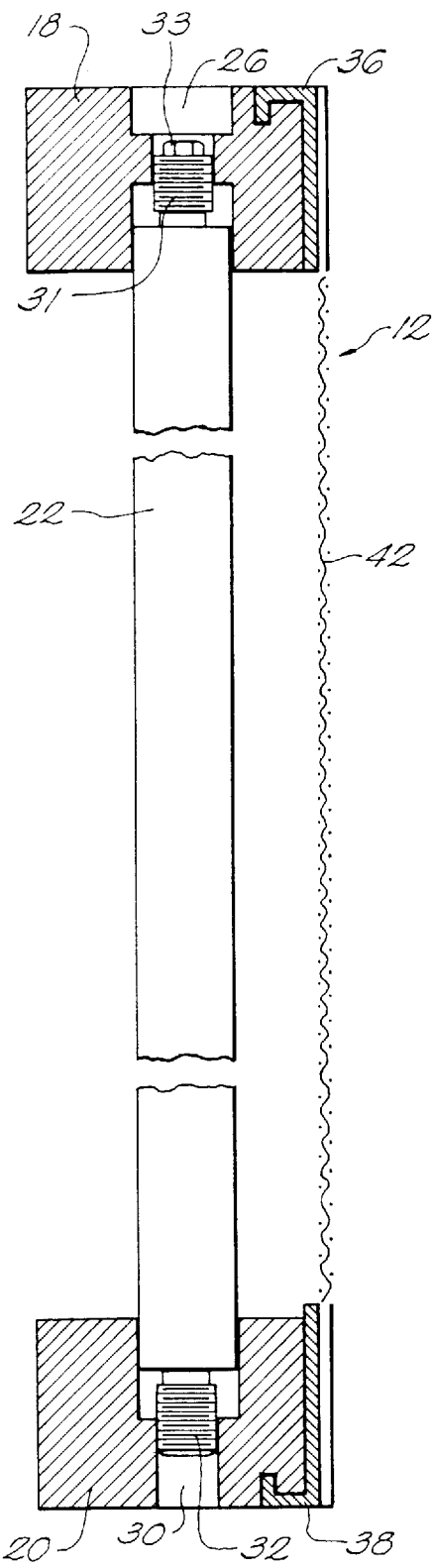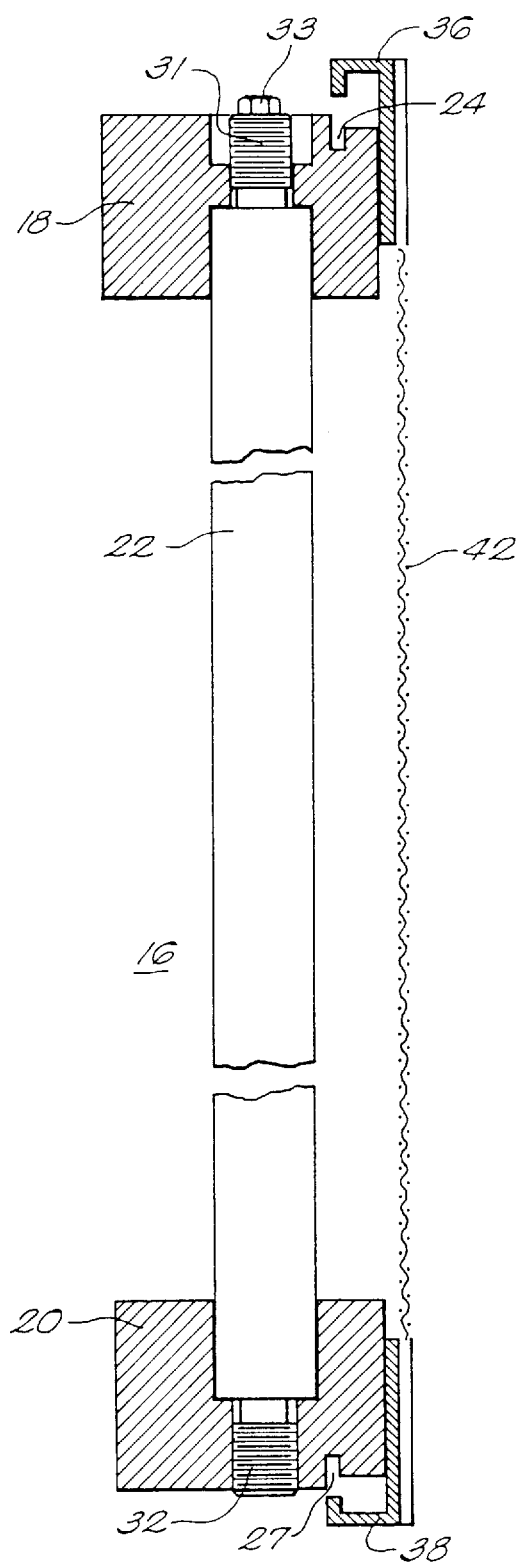
*FIG. 3A*  *FIG. 3B*

SCREEN BASKET HAVING A REMOVABLE AND REPLACEABLE CYLINDRICAL MESH LINER

BACKGROUND OF THE INVENTION

The invention relates to the field of filter elements for filtering solids from a liquid, and in particular to a screen basket for use in filtering an aqueous fiber solution.

Screening systems are widely used in manufacturing processes to separate larger particles from a liquid/solid suspension. For example, applications for screening systems include processing chemical pulp, mechanical groundwood, bleached or unbleached kraft, old corrugated containers, mixed news, deink stock, waste paper or any other type of fiber.

The system typically receives several thousand gallons per minute of liquid/solid suspension, and separates the larger particles using a pressure screen which typically provides an accept flow (smaller particles) and a reject flow (larger particles). An example of a pressure screen is the Model 400 available from Voith Sulzer, the assignee of the present invention.

Pressure screens often filter the liquid/solid suspension through a slotted or perforated cylindrical screen basket. These prior art screen baskets are relatively expensive, and when the filtering element of the screen basket punctures the pressure screen must be shutdown. The screen basket is then replaced and the pressure screen is brought back on line. The failed screen basket is then generally discarded since repair is too difficult.

The difficulty in repairing the screen basket is primarily due to the relatively complicated structure of the basket. For example, U.S. Pat. Nos. 3,716,144 and 5,255,790 disclose fabricating screen baskets from a plurality of wires secured by welding or brazing to transversely standing support elements. The wires are profiled and suitably spaced to define continuous screening slots communicating with continuous relief slots, the latter being transversed at spaced locations by the support elements.

U.S. Pat. No. 5,513,757 discloses an improved continuous cut slot screen basket having excellent structural integrity and continuous screening slots of uniform width. However, the screen basket has a relatively complex structure and as a result is relatively expensive to manufacture. In addition, if the basket fails it is removed from the pressure screen, discarded and replaced with another screen basket. Because of the structural complexity of the basket, it is too difficult to repair and hence the entire screen basket is discarded.

Therefore, there is a need for a screen basket that can be easily repaired.

SUMMARY OF THE INVENTION

An object of the present invention is to provide a screen basket having a filter element that is easily replaced.

Briefly, according to the present invention, a screen basket for filtering an aqueous fiber suspension includes a cylindrical foraminous filter element, anchoring collars surrounding and fixed to opposite ends of the filter element, at least two support rings surrounding the filter element, and means for adjusting the support rings between axially contracted positions disengaged from the anchoring collars, and axially expanded positions engaging the anchoring collars and axially tensioning the filter element.

In a first embodiment, the anchoring collars are relatively flexible. This allows the anchoring collars to be deformed for insertion of the cylindrical foraminous filter element within the support rings.

Alternatively, the upper and lower support rings are divided into segments that are easily disassembled and reassembled to facilitate removal of a defective cylindrical foraminous filter element and installation of a new filter element.

Advantageously, the screen basket includes a reusable rigid frame that cooperates with a replaceable and disposable cylindrical foraminous filter element.

These and other objects, features and advantages of the present invention will become apparent in light of the following detailed description of preferred embodiments thereof, as illustrated in the accompanying drawings.

BRIEF DESCRIPTION OF THE DRAWINGS

FIG. 3A illustrates a cross sectional view of the cylindrical foraminous filter element tensionally engaged within the screen basket frame;

FIG. 3B illustrates a cross sectional view of the cylindrical foraminous filter element disengaged from the screen basket frame;

DETAILED DESCRIPTION OF THE INVENTION

Figure 1:
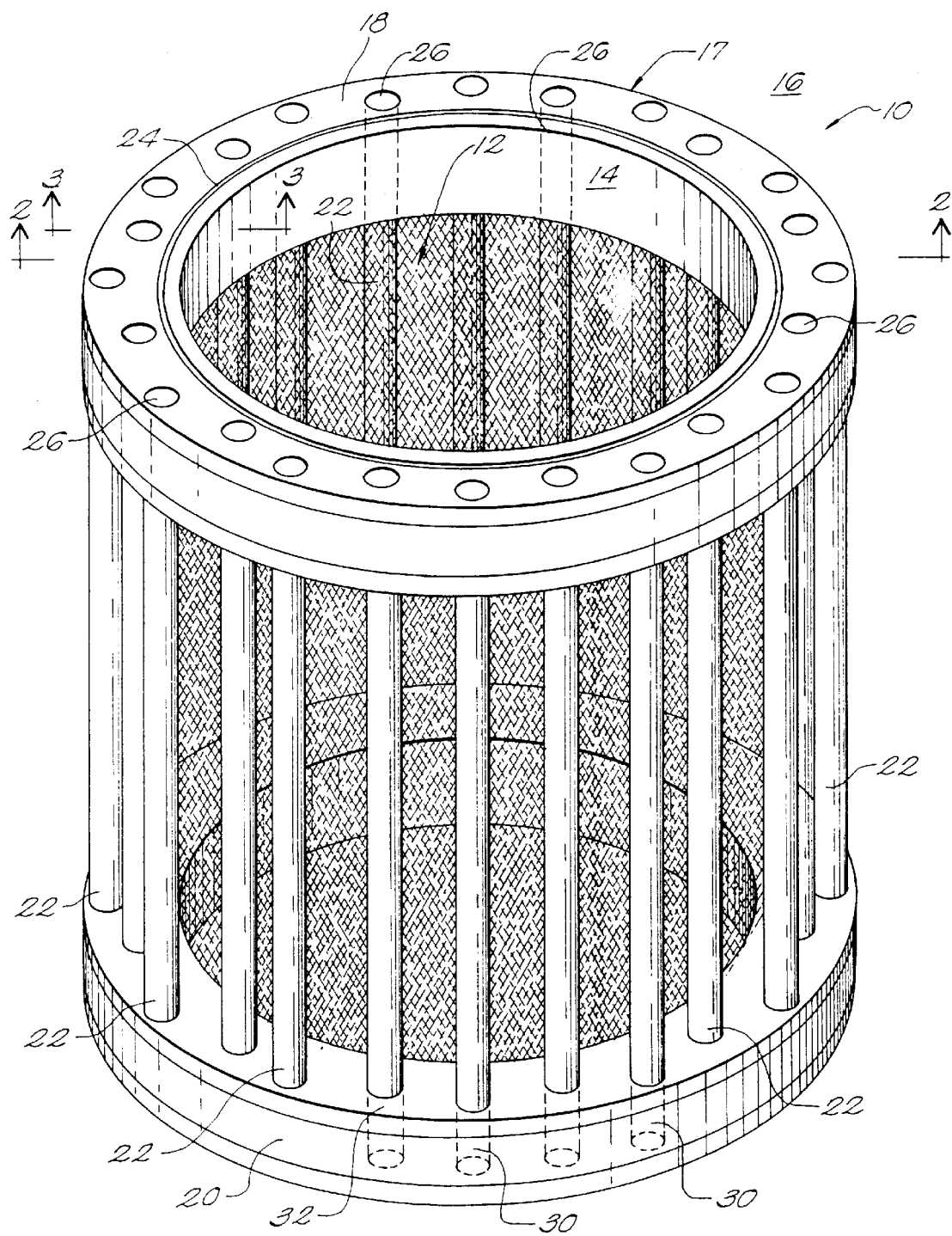
FIG. 1 illustrates a perspective view of a screen basket according to the present invention.
Figure 2:
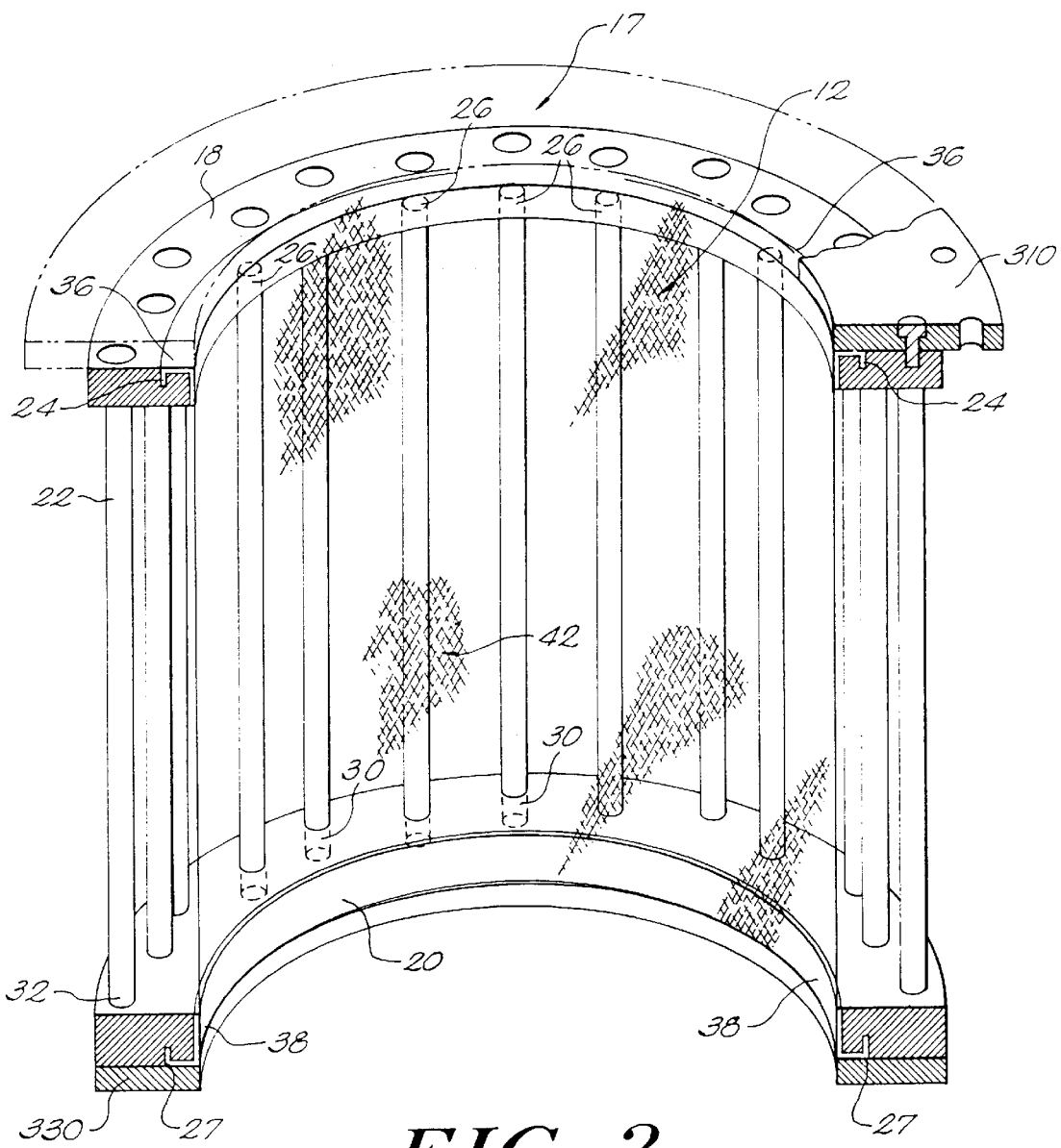
FIG. 2 illustrates a cross sectional view taken across line 2—2 of the screen basket illustrated in FIG. 1.

FIG. 1 illustrates a perspective view of a screen basket 10 for filtering an aqueous fiber suspension. FIG. 2 illustrates a cross sectional view of the screen basket 10 (note several elements have been added to the basket in this view for ease of illustration, which are not shown in FIG. 1). Referring to FIGS. 1 and 2, the screen basket 10 includes a removable and replaceable cylindrical foraminous filter element 12 having an interior feed side 14 and an exterior accept side 16. The screen basket 10 also includes a rigid frame 17 comprising an upper support ring 18, a lower support ring 20 and a plurality of support rods 22 extending between the upper and lower support rings 18, 20. Significantly, the reusable rigid frame 17 cooperates with the removable and replaceable cylindrical foraminous filter element 12 to provide the screen basket 10 of the present invention.

The upper support ring 18 includes an upper circular anchor channel 24 and a plurality of circumferentially spaced upper threaded apertures 26. Similarly, the lower support ring 20 comprises a lower circular anchor channel 27 (FIG. 2) and a plurality of circumferentially spaced lower threaded apertures 30 each of which is aligned coaxially with an associated one of the upper threaded apertures 26. Referring to FIG. 2, the screen basket may also include a mounting flange 310 for attaching the screen basket within a pressure screen (not shown). The mounting flange may be attached to the upper or lower support rings, or flanges may be attached to both support rings 18, 20. FIG. 2 also illustrates a clamp 330 that is positioned over the outer axial side of the lower support ring 20 to assist in holding the filter element 12 in the anchor channel 27. Although the clamp is only shown mounted in cooperation with the lower support ring, one of ordinary skill will recognize that a clamp may also be mounted on the axial outer side of the upper support ring 18.

FIG. 3A illustrates a cross sectional view taken across line 3—3 shown in FIG. 1. Referring now to FIGS. 2 and 3A, the cylindrical mesh liner 12 includes a U-shaped upper anchor collar 36 that is engageable with the upper circular anchor channel 24 and a U-shaped lower anchor collar 38 engageable with the lower circular anchor channel 27. A cylindrical meshing 42 is securely attached between the upper and lower anchors 36,38. In this view the cylindrical foraminous filter element 12 is engaged to the upper and lower support rings 18,20 of the screen basket frame 17. The perforation size in the cylindrical meshing is selected based upon the minimum size particle to be removed from the aqueous fiber suspension.

Notably, each of the plurality of support rods 22 extending between the support rings 18,20 have oppositely threaded ends 31,32 engaged respectively in the upper and lower threaded apertures 26,30. Upon rotation of a support rod 22 in one direction, the distance between the support rings 18,20 decreases due to the oppositely threaded ends 31,32 of the support rods 22. Rotation of the rods in the opposite direction increases the distance between the support rings 18,20. Each of the support rods includes a wrench head 33 that facilitates rotating the rods.

FIG. 3B illustrates a cross-sectional view similar to the view in FIG. 3A, with the exception that the support rods 22 have been rotated to disengage the filter element 12 from the basket frame 17. As the rods 22 are rotated to disengage the filter element 12, the distance between the upper and lower support rings 18,20 decreases since each rod includes oppositely threaded ends 31,32.

Figure 4:
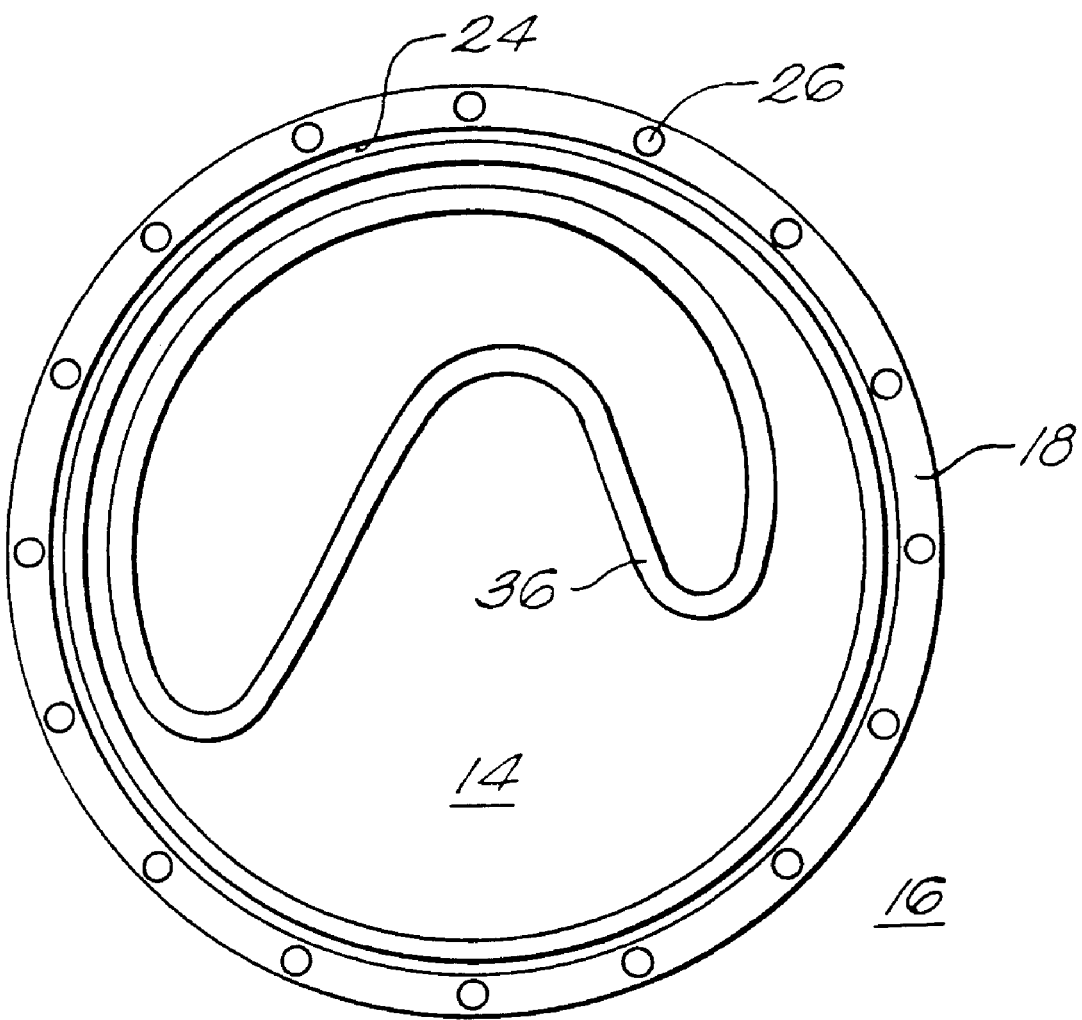
FIG. 4 illustrates a top view of the cylindrical foraminous filter element compressed to be inserted into the screen basket frame.

In a first embodiment, the upper and lower anchors 36,38 are flexible. This allows the anchors 36,38 to be compressed so the cylindrical foraminous filter element 12 can be inserted into the rigid frame 17. FIG. 4 illustrates a top view of the cylindrical foraminous filter element 12 compressed to be inserted into the screen basket frame 17. Specifically, the upper and lower anchors 36,38 and the cylindrical meshing 42 (not shown) are folded so the cylindrical mesh filter element 12 can be placed within the screen basket frame. The cylindrical filter element 12 is inserted so the upper anchor 36 coaxially extends beyond the upper circular anchor channel 24 and the lower anchor 38 coaxially extends beyond the lower circular anchor channel 27, as shown in FIG. 3B. The cylindrical filter element 12 is then unfolded so it returns to its cylindrical shape. The rotatable support rods 22 are then rotated so the distance between the upper support ring 18 and the lower support ring 20 increases causing the anchors 36,38 to engage their respective channels 24,27. This also coaxially tensions the meshing 42 of the cylindrical mesh filter element 12.

To remove the cylindrical filter element 12 from the frame 17, the rods 22 are turned in the opposite direction to decrease the distance between the support rings 18,20. As the distance decreases, the anchors disengage 36,38 from their respective anchor channels 24,27. The upper and lower anchors 36,38 are then compressed as shown in FIG. 4 and the cylindrical mesh filter element 12 is removed from the interior of the frame 17.

Advantageously, in the event of a failure of the screen basket 10 (e.g., a tear in the meshing 42), the pressure screen is turned-off and opened. The screen basket 10 is then removed and replaced with another screen basket. The pressure screen is then closed and returned to operation. The screen basket 10 is repaired by removing the failed cylindrical foraminous filter element 12 and replacing it with a new cylindrical foraminous filter element.

Figure 5:
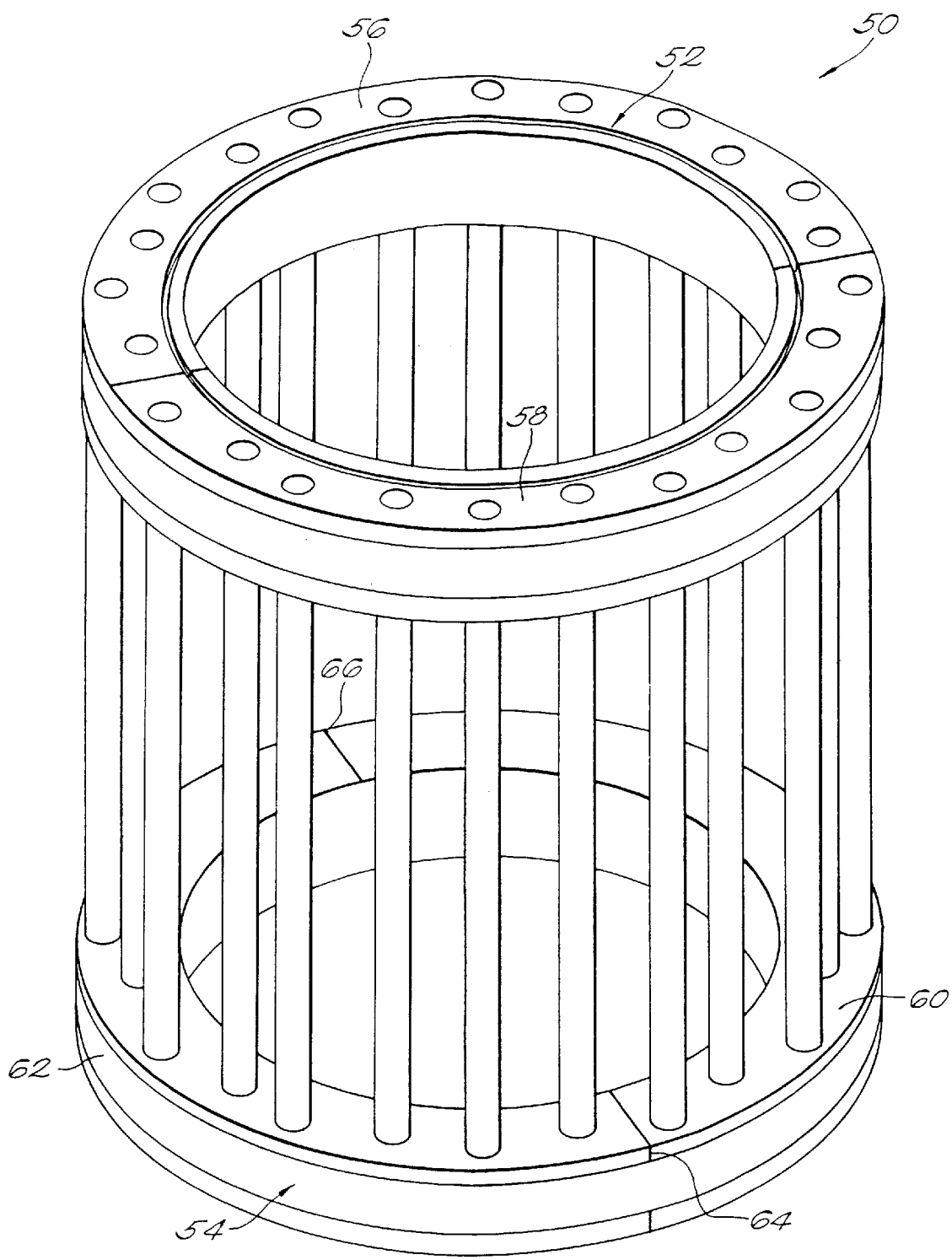
FIG. 5 illustrates a perspective view of an alternative embodiment screen basket having a segmented upper support ring and a segmented lower support ring.

In a second embodiment, the upper and lower anchors 36,38 are rigid. Therefore, the cylindrical foraminous filter element 12 cannot be folded for insertion into the screen basket frame 17. FIG. 5 illustrates a perspective view of a screen basket frame 50 suitable for use with a cylindrical mesh filter element having rigid upper and lower anchors 36,38. Significantly, the screen basket frame 50 includes upper and lower support rings 52,54 that are divisible into a plurality of segments. For example, the upper support ring 52 includes semi-circular segments 56,58 and the lower support ring 54 includes semi-circular segments 60,62. To assemble the screen basket 10, the lower semicircular segments 60,62 are placed around the filter element and mate along lines 64,66 to provide the circular lower support ring 54. A hose clamp may also be added to reinforce the articulated support rings. Once the lower support ring 54 is assembled around the mesh liner, each of the plurality of the rods 22 is inserted into its threaded aperture in the lower support ring 54. Each of the rods 22 is preferably rotated once or twice to engage its threaded aperture. The upper support ring 52 is then assembled by interlocking the upper semicircular segments 56,58. The upper support ring 52 is then positioned to coaxially align the upper threaded apertures with the rods. Each of the rods 22 is then turned to engage both the upper and lower threaded apertures. It is contemplated that the locations at which the semicircular segments of the upper and lower support rings are joined are annularly offset by 90°, as shown in FIG. 5.

Figure 6:
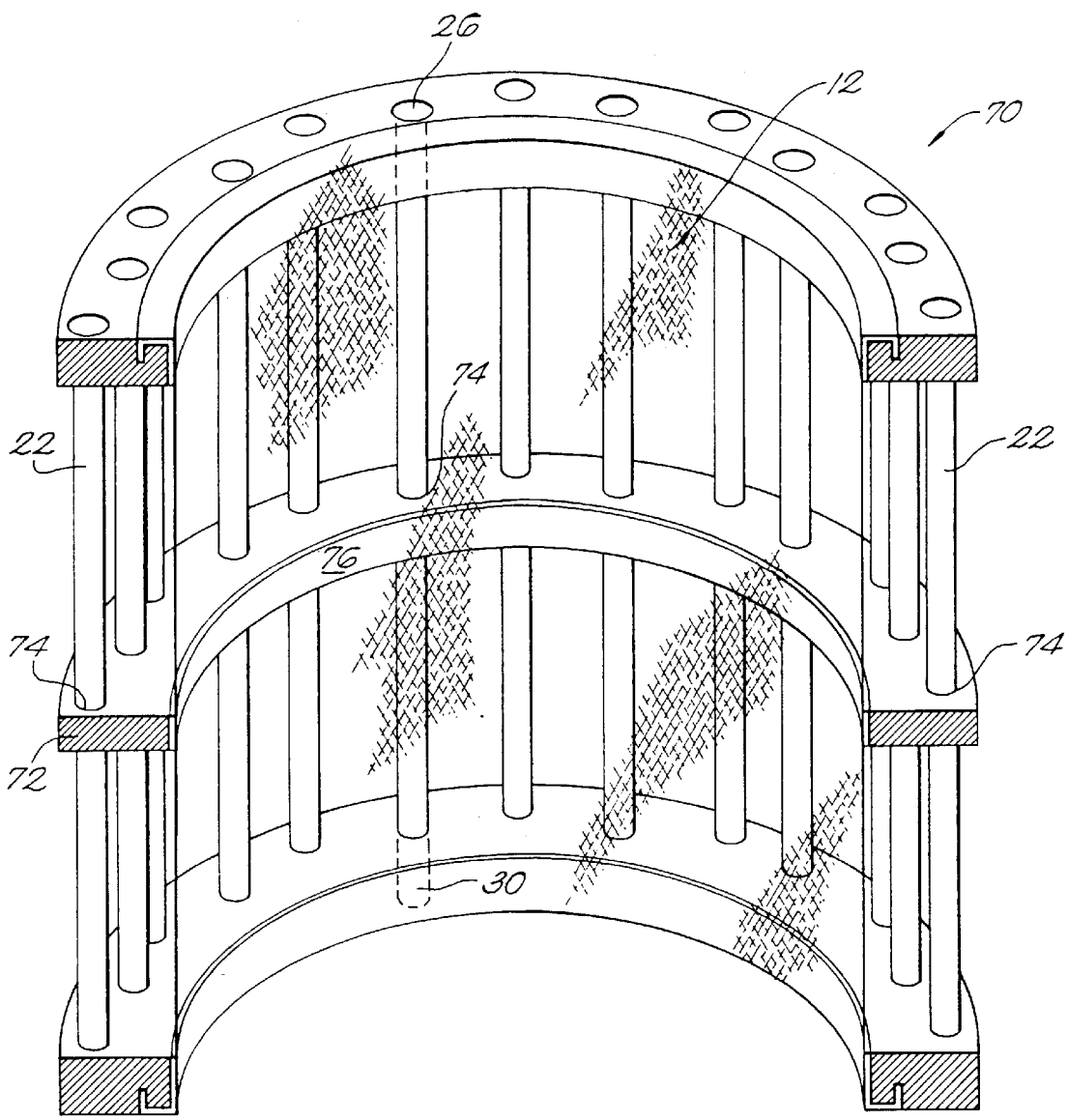
FIG. 6 illustrates a cross sectional view of yet another alternative embodiment screen basket.

FIG. 6 is a cross-sectional illustration of a alternative embodiment screen basket 70. This screen basket is substantially the same as the filter screen basket illustrated in FIG. 1, with the principal exception that this basket includes a middle support ring 72. The middle support ring 72 includes a plurality of circumferentially arranged middle apertures 74, each uniquely associated with one of the upper threaded apertures 26 and one of the lower threaded apertures 30, such that each of the support rods 22 passes through an associated one of the middle apertures 74. The middle support ring 72 includes a facing wall 76 to which a portion of the cylindrical foraminous mesh liner is attached (e.g., by welding or brazing).

Figure 7:
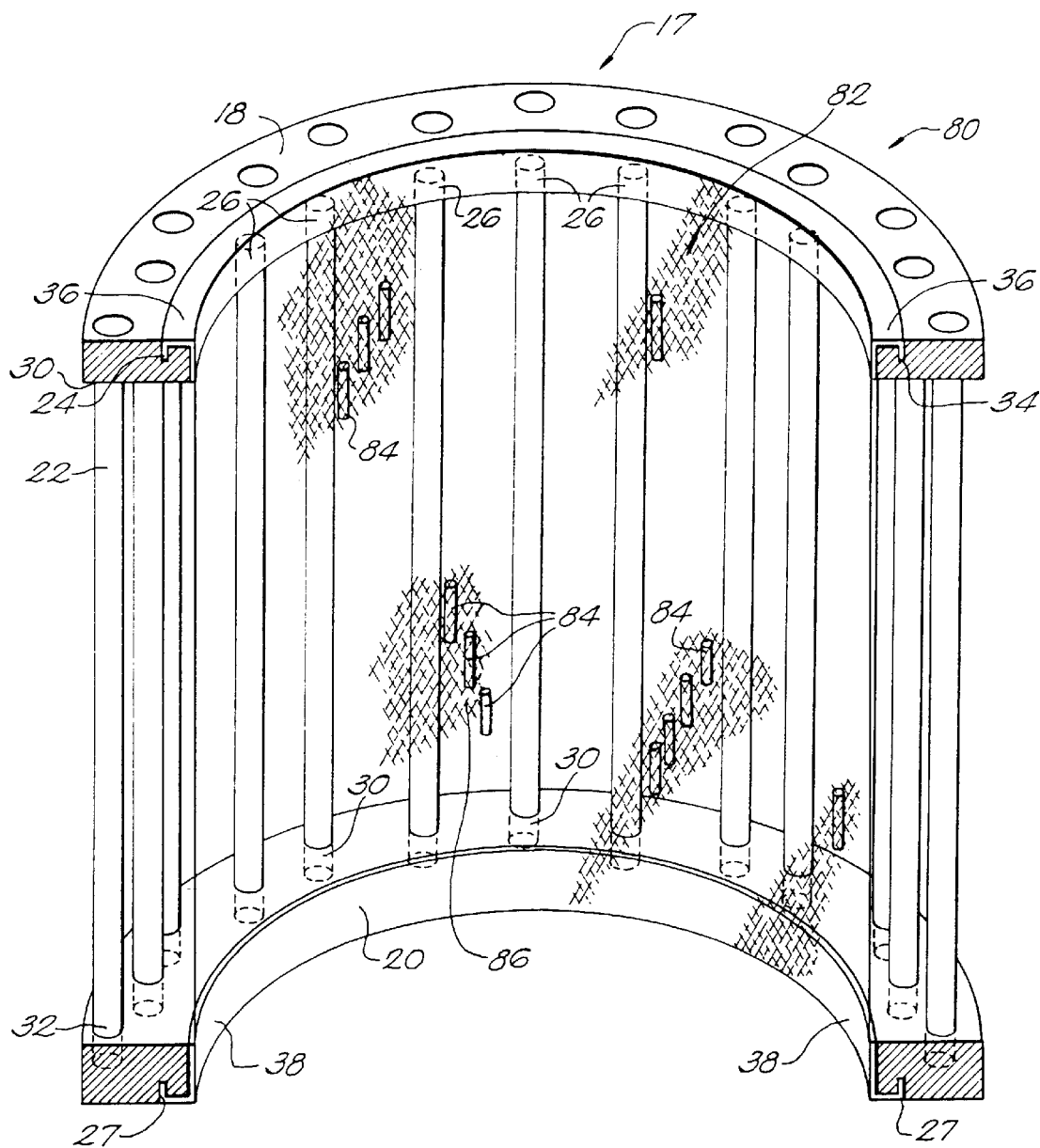
FIG. 7 illustrates a cross sectional view of the screen basket having a filter element with staggered bars interspersed within the mesh.

FIG. 7 illustrates a cross sectional view of a screen basket 80 having a filter element 82 with staggered bars 84 interspersed and held within meshing 86 (e.g., by being brazed to the meshing). Significantly, the staggered bars 84 assist in creating a turbulent flow within the screen basket in cooperation with the rotor (not shown) of the pressure screen. Specifically, as the rotor rotates within the filter element 82, the blades of the rotor cooperate with the staggered bars 84 to create a turbulence that assists in removing fibers from the meshing 86. The bars 84 are preferably about several inches long. However, it is contemplated that each bar may be either shorter or longer dependent upon factors such as the overall size of the basket, the aqueous solution to be filtered and the characteristics of the rotor. The bars 84 may be arranged in various configurations within the meshing 86 including helical.

Although the present invention has been shown and described with respect to several preferred embodiments thereof, various changes, omissions and additions to the form and detail thereof, may be made therein, without departing from the spirit and scope of the invention.

What is claimed is:

1. A screen basket for filtering an aqueous fiber suspension, comprising:

an upper support ring having an upper circular anchor channel and a plurality of circumferentially spaced upper threaded apertures;

a lower support ring having a lower circular anchor channel and a plurality of circumferentially spaced lower threaded apertures each of which is aligned coaxially with an associated one of said upper threaded apertures;

a cylindrical mesh liner having an upper anchor engaged with said upper circular anchor channel and a lower anchor engaged with said lower circular anchor channel; and a plurality of support rods extending between said support rings, each of said support rods having oppositely threaded ends engaged respectively in said upper and lower threaded apertures, said support rods extending between said support rings to engage said anchors to said channels upon rotation in one direction, and disengage said anchors from said anchor channels upon rotation in an opposite direction.

2. The screen basket of claim 1, wherein said upper and lower anchors are flexible.

3. The screen basket of claim 1, wherein said upper and lower support rings are divisible into semicircular segments.

4. The screen basket of claim 3, wherein said upper and lower anchors are rigid.

5. The screen basket of claim 3, further comprising a ring clamp that surrounds said upper support ring.

6. The screen basket of claim 3, wherein the locations at which said semicircular segments at which said upper and lower support rings are joined are annularly offset by 90°.

7. The screen basket of claim 1, wherein said upper support ring includes a plurality of upper segments, and said lower support ring includes a plurality of lower segments.

8. The screen basket of claim 1, further comprising an intermediate support ring located between said upper and lower support rings and having a plurality of circumferentially arranged middle apertures each uniquely associated with one of said upper threaded apertures and one of said lower threaded apertures, such that each of said support rods passes through an associated one of said middle apertures.

9. The screen basket of claim 8, wherein said intermediate support ring includes a facing wall to which said cylindrical mesh is attached by welding.

10. The screen basket of claim 1, wherein said upper and lower anchors are U-shaped.

11. The screen basket of claim 1, wherein each of said support rods includes a wrench head which facilitates rod rotation.

12. The screen basket of claim 1, wherein said cylindrical mesh liner includes staggered rods interspersed within meshing of said cylindrical mesh liner.

13. The screen basket of claim 12, wherein said staggered rods are about several inches long and brazed to said meshing.

14. The screen basket of claim 1, further comprising a mounting flange attached to an axial outer surface of said upper support ring.

15. The screen basket of claim 1, further comprising a circular clamp which is attached to and abuts against an axial outer surface of said lower support ring.

16. A screen basket for removing contaminants from an aqueous papermaking stock, said screen basket comprising:

an upper support ring that includes an upper circular anchor channel and a plurality of circumferentially arranged longitudinal upper threaded apertures;

a lower support ring that includes a lower circular anchor channel and a plurality of circumferentially arranged longitudinal lower threaded apertures each of which is coaxial with an associated one of said plurality of longitudinal upper threaded apertures;

a support ring having a plurality of circumferentially arranged middle apertures each uniquely associated with one of said upper threaded apertures and one of said lower threaded apertures;

a removable and replaceable cylindrical mesh liner having an upper anchor that engageably seats in said upper circular anchor channel and a lower anchor that engageably seats in said lower circular anchor channel; and a plurality of support rods each of which passes through an associated one of said longitudinal lower and upper threaded apertures and said middle apertures, wherein each rod includes first and second threaded ends that are oppositely threaded, said support rods extending between said support rings to engage said anchors to said channels upon rotation in one direction, and disengage said anchors from said anchor channels upon rotation in an opposite direction.

* * * * *